United States Patent [19]
Brooks et al.

[11] Patent Number: 5,799,548
[45] Date of Patent: Sep. 1, 1998

[54] FRAME WITH MOLDED FEATURES

[75] Inventors: Henry Marshall Brooks; Daniel George Mlejnek, both of Lexington; Harald Portig, Versailles; Richard Andrew Seman, Jr., Lexington, all of Ky.

[73] Assignee: Lexmark International, Inc., Lexington, Ky.

[21] Appl. No.: 684,778

[22] Filed: Jul. 22, 1996

[51] Int. Cl.$^6$ .................................................. G05G 1/00
[52] U.S. Cl. ........................... 74/606 R; 74/421 R
[58] Field of Search .................... 74/421 R, 412 R, 74/413, 606 R; 384/372, 380, 381, 416, 417

[56] References Cited

U.S. PATENT DOCUMENTS

| | | | |
|---|---|---|---|
| 3,015,859 | 1/1962 | Bloom | 18/59 |
| 3,350,953 | 11/1967 | Stewart | 74/412 R X |
| 3,845,668 | 11/1974 | Underwood | 74/412 |
| 4,433,589 | 2/1984 | Chaconas | 74/421 R X |
| 4,462,949 | 7/1984 | Fehlmann | 264/261 |
| 4,761,860 | 8/1988 | Krauss | 411/339 X |
| 5,458,603 | 10/1995 | Futch, Sr. | 74/421 R X |

FOREIGN PATENT DOCUMENTS

| | | | |
|---|---|---|---|
| 1309117 | 10/1962 | France | 411/338 |
| 2660040 | 9/1991 | France | 74/413 |

*Primary Examiner*—Charles A. Marmor
*Assistant Examiner*—Saul Rodriguez
*Attorney, Agent, or Firm*—John A. Brady

[57] ABSTRACT

A gearbox (1) is formed by two steel plates (3,5) which support molded elements (such as 13b and combined 35e, 33e). A separate molding operation is performed on each plate, in which a plurality of individual molded parts are molded. The precise positioning is from the mold, not the plate. The liquid plastic is bound to the plate by entering a plurality of holes (such as 66 and 66a) for each part. The plates are then populated and then held together by screws (72a–72d). A bevel gear (31) is mounted on the outside by molded supports (29a, 29b) and by contact with gear (36) with which it meshes.

15 Claims, 11 Drawing Sheets

FRAME WITH MOLDED FEATURES

TECHNICAL FIELD

This invention relates to the manufacture of high-precision frame structures, such as gearbox frames, by molding plastic.

BACKGROUND OF THE INVENTION

In products such as personal printers and typewriters, gears have usually been mounted on steel shafts about which they rotate. Such assemblies contain many parts and usually require several riveting operations and/or fasteners during assembly. With modern plastic materials, however, it is generally not necessary to have gears rotate on steel surfaces.

Normally, plastic is molded around or mixed with supporting members. In accordance with this invention individual plastic elements, such as spacers and shafts for gears, are molded at separated locations on a support member. This is believed to be a novel technique for such purpose. The following two patents disclose molding by which parts of the molding frame become integrated into the final element produced, but not the molding of individual elements at separated locations: U.S. Pat. Nos. 3,015,859 to Bloom and 4,462,949 to Fehlmann.

DISCLOSURE OF THE INVENTION

Two plates or other elements, which ultimately will be spaced apart in a fixed relationship to form a frame, are made to have one or more holes at the locations at which individual plastic members are to be located. A separate molding operation is performed on each plate, in which a plurality of individual molded parts are molded on the plate. These are precisely positioned by the mold. The liquid plastic is bound to the plate by entering the plurality of holes in the plate at the location for each part. However, the precise location is by the mold and not by the holes in the plate. The mold is a single mold for all of the parts on each plate, and may be fabricated to a high level of accuracy. The two plates are then populated with gears on the shafts or with other intermeshing elements and with any other elements to be located between the plates. The two plates are then mounted together spaced apart by spacers which may have been some of the individual parts molded.

Meeting shafts from each plate may be staggered slightly to counter normal twisting forces of a gear or other member mounted on the meeting shafts. The separation between such meeting shafts may be filled with grease as a lubricant.

A frame with a high degree of precision is achieved at much reduced cost over forming the frame by attaching parts with fasteners or by other conventional procedures.

BRIEF DESCRIPTION OF THE DRAWING

The details of this invention will be described in connection with the accompanying drawing in which

FIG. 6b is an enlarge view of the circled portion in FIG. 6a;

BEST MODE FOR CARRYING OUT THE INVENTION

Figure 1:
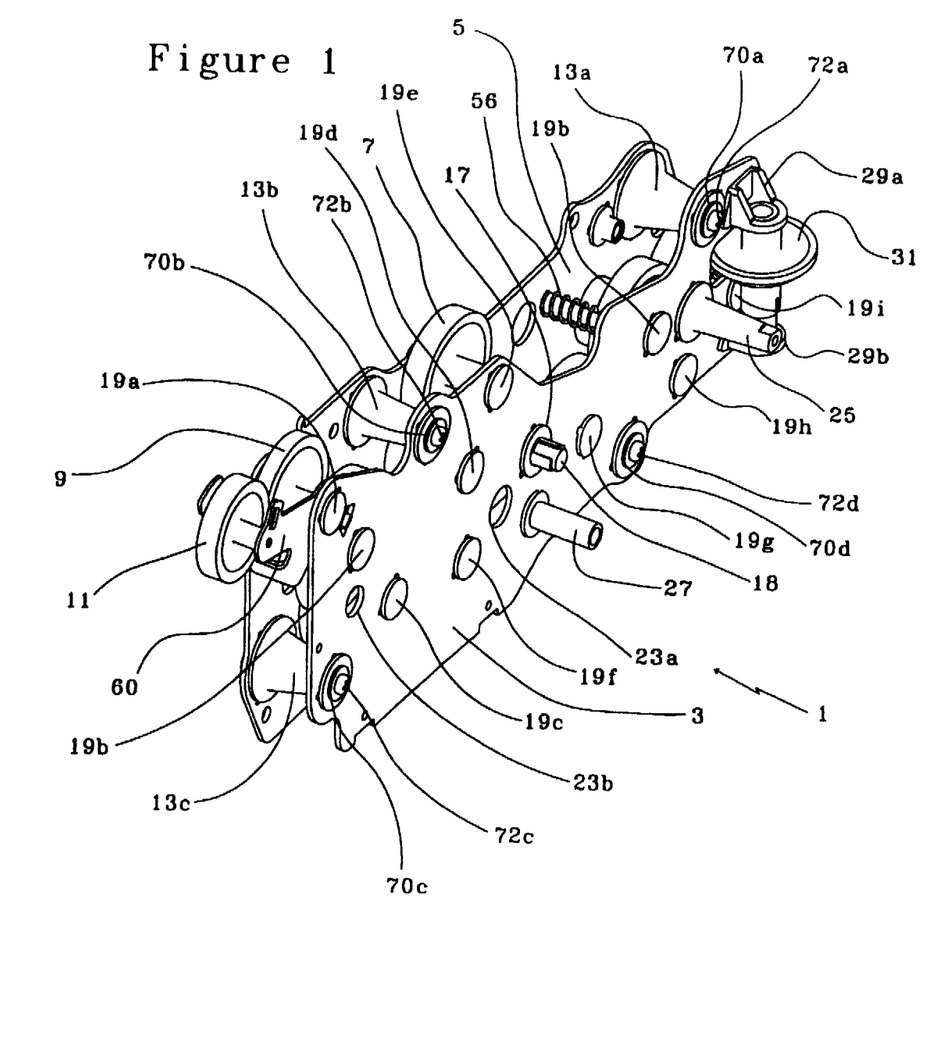
FIG. 1 shows an assembled gearbox from one side.

An Assembled gearbox 1 in accordance with this invention is shown in FIG. 1. Outer plate 3 is a steel plate 1.6 mm thick (preplated with zinc, then all holes are punched). Inner plate 5 is a steel plate of the same thickness and kind and generally the same outer dimensions. FIG. 1 shows gears with gearbox 1, including representative gears 7, 9, and 11. Other gears are mounted on shafts molded into plates 3 and 5 as will be described. Conical elements 13a, 13b and 13c are separators (termed standoffs) to define the distance between plate 3 and plate 5. Holes 15a, 15b, and 15c (see FIG. 2) receive the outward end of standoffs 13a, 13b and 13c, respectively.

Figure 2:
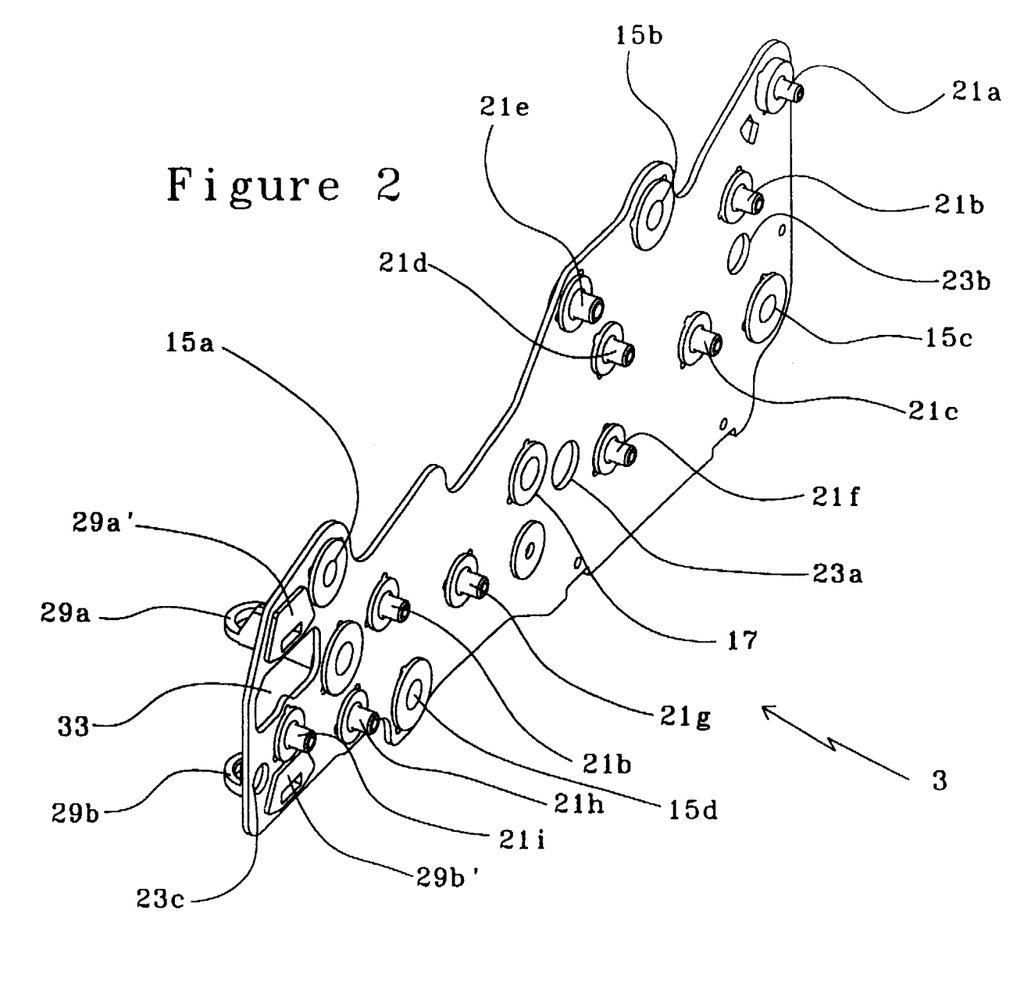
FIG. 2 shows the outer plate forming the gearbox from the side opposite that of FIG. 1.

Bushing 17 receives the shaft of a smaller gear 18 (FIG. 1) from within gearbox 1 which protrudes through bushing 17. Elements 19a through 19j (FIG. 1) are the back side of studs 21a through 21j respectively (FIG. 2). Additional elements of plate 3 are access hole 23a and locator holes 23b and 23c (FIG. 2). The holes 23b and 23c are used during the molding operation described below and for tooling; a mounting element 25, and a mounting element 27, both extend outward from gearbox 1 for mounting apparatus to gearbox 1 (shaft 27 has a central opening to receive a grounding screw); and top support structure 29a and bottom support structure 29b for a bevel gear 31. Bevel gear 31 is shown mounted in FIG. 1. A part of bevel gear 31 enters the gearbox 1 through hole 33 (FIG. 2) in plate 3. The backside of support elements 29a and 29b (FIG. 1) are elements 29a' and 29b' (see FIG. 2).

Figure 3:
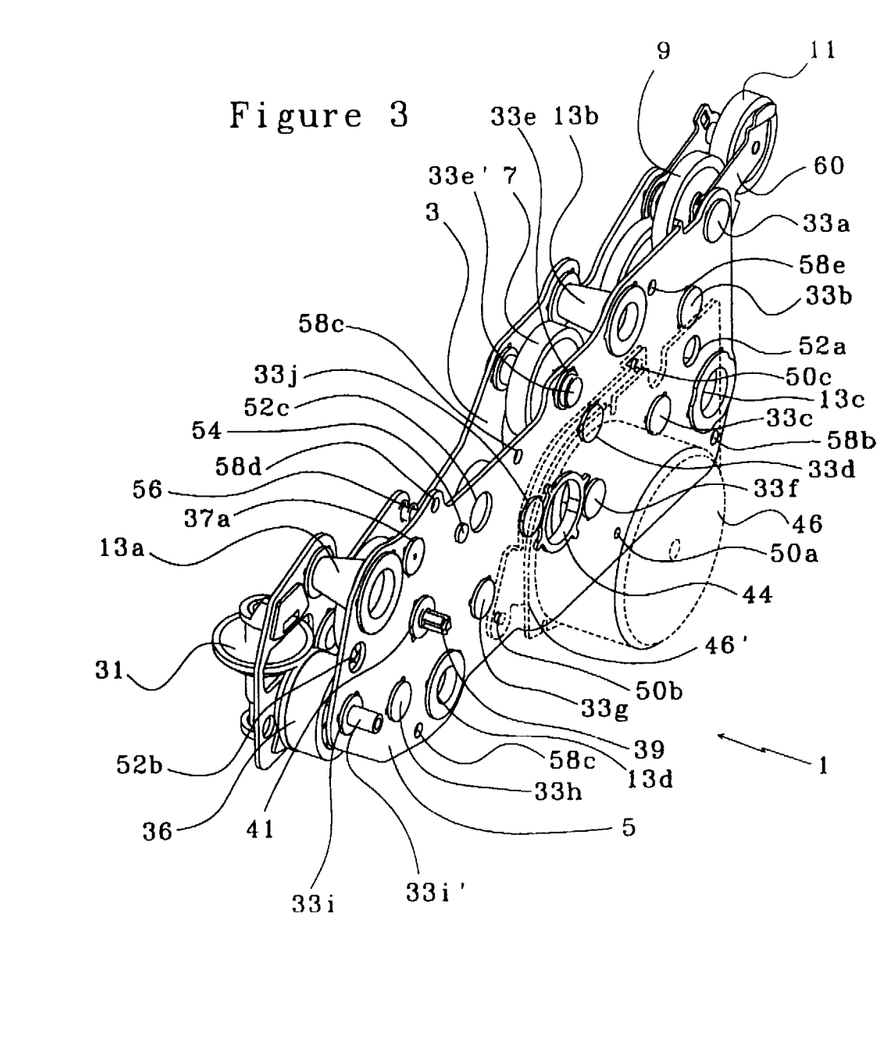
FIG. 3 shows the assembled gearbox from the side opposite FIG. 1.

FIG. 3 shows gearbox 1 from the side opposite the view of FIG. 1. Elements 33a through 33j are the back sides of studs 35a through 35j (FIG. 4) respectively.

Figure 4:
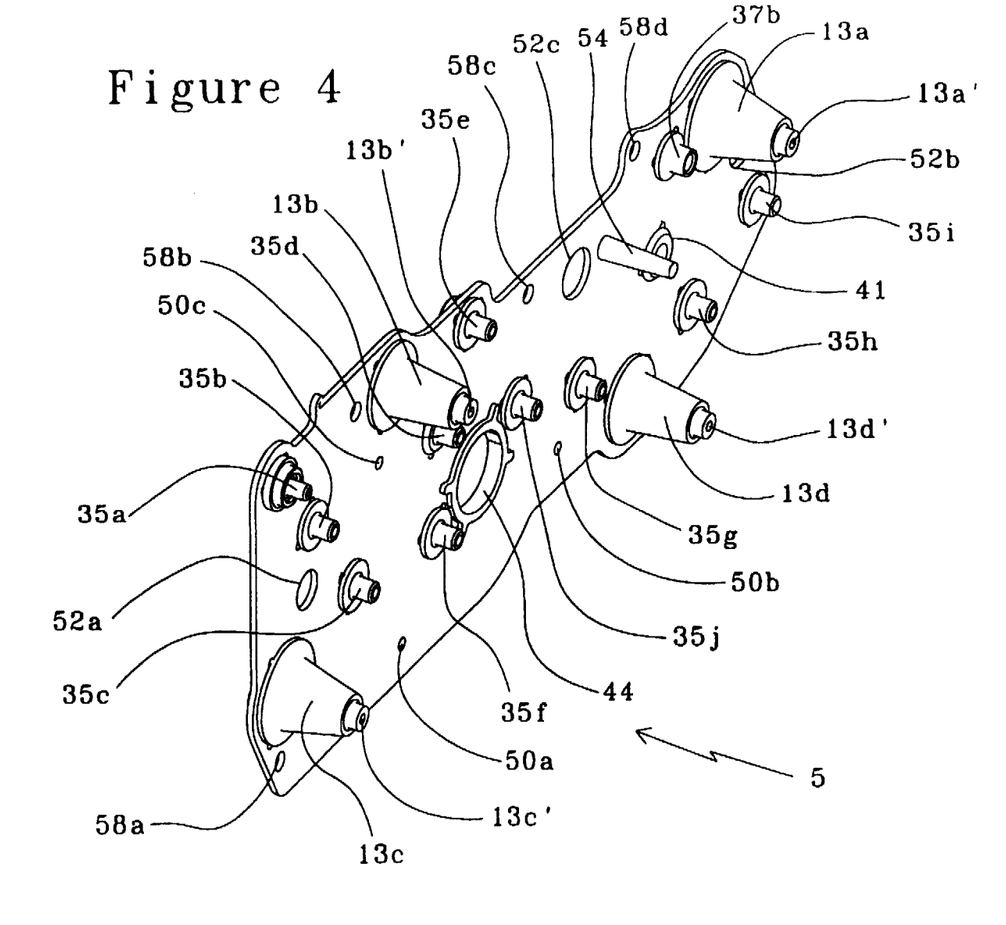
FIG. 4 shows the inner plate forming the gearbox alone from the side viewed in FIG. 1.

The protruding molded elements on 33e' and 33i' on elements 33e and 33i respectively are the primary locators for the gearbox 1 when mounted in a printer. Stud 35i supports gear 36 (FIG. 3) and stud 35e supports gear 7, so locators 33e' and 33i' are most accurate with respect to locating gear 36 and gear 7. Element 37a is the back side of bushing 37b (FIG. 4). In addition to the three standoffs 13a through 13c shown in FIG. 1, a fourth standoff 13d is shown in FIG. 4.

Gear 39 extends through bushing 41 (FIG. 3). Motor locator 44 is a large hole surrounded by molded plastic. As shown in dotted outline a motor 46 having a mounting plate 46' held to plate 5 by bolts through mounting holes 50a, 50b and 50c. Additional elements of plate 5 are access holes 52c and locator holes 52a and 52b. Holes 52a and 52c are used during the molding operation described below and for tooling. Further elements of plate 5 are a post 54 (FIG. 4) for ground spring 56 (FIG. 1 and FIG. 3), and mounting holes 58a through 58c (holes 58d and 58e are not used). Pivot arm 60 of stamped steel mounts gear 11.

Figure 5:
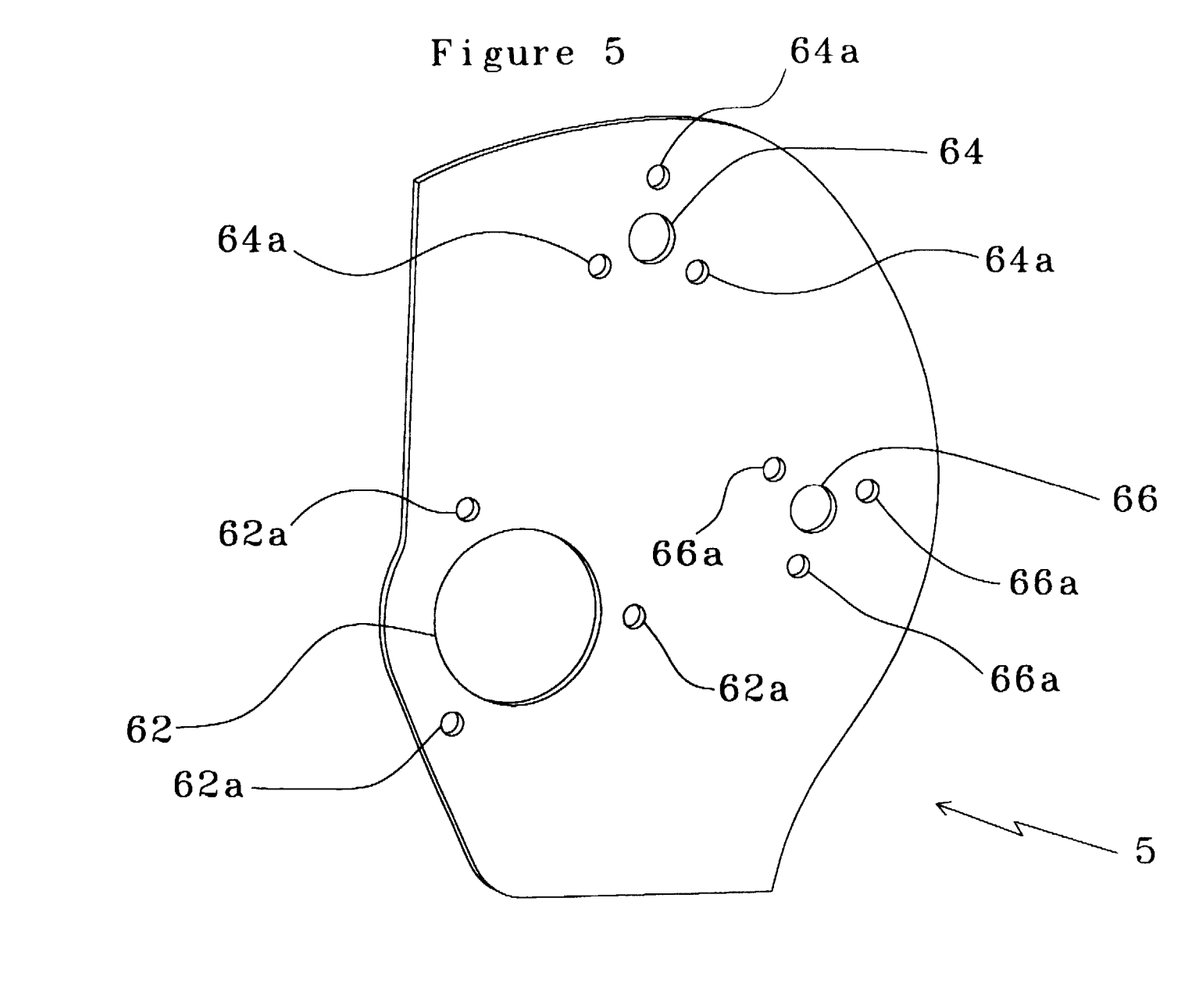
FIG. 5 shows representative clusters of holes to receive plastic surrounding a larger hole in one of the plates.

FIG. 5 shows representative cluster of holes in a plate, which may be plate 5. Holes 62, 64 and 66 are to anchor molded part and each are surrounded by three equally-spaced smaller holes 62a, 64a and 66a respectively. The surrounding holes 62a, 64a, and 66a provide anchors so that as the plastic shrinks on cooling the center of the element molded does not move.

Figure 6A:
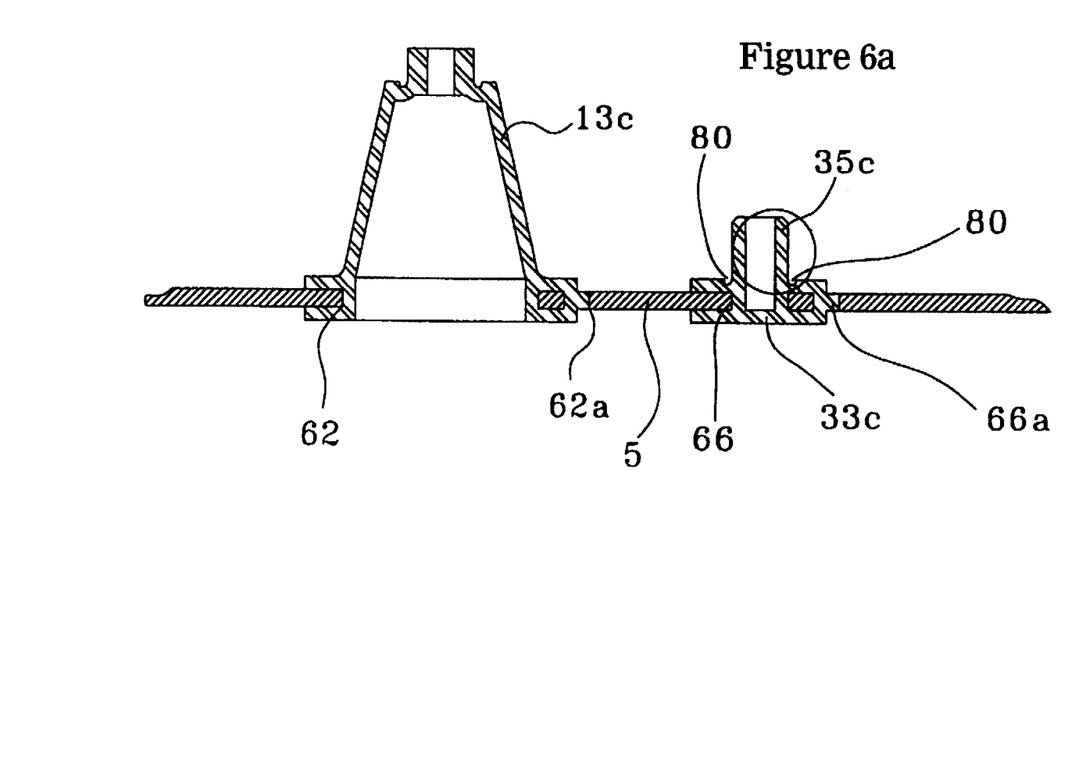
FIG. 6a is a representative side view showing the plastic elements as molded through the holes of FIG. 5.

FIG. 6 is a cross section of elements as molded onto a plate 5 having holes as shown in FIG. 5. In FIG. 6 the single striped cross hatching represents the steel plate 5 and the double striped cross hatching represents molded plastic. FIG. 6 shows one standoff which may be representative of a standoff 13c and one stud, which may be a stud 35c having a reverse side 33c. For purposes of illustration, the standoff 13c is assumed to have been formed over hole 62 of FIG. 5 and the stud 35c is assumed to have been formed over hole 66. As shown the plastic for both elements 13c and 35c is molded as a single unit (33c being unitory with 35c) around the holes 62 and 66 respectfully and through the holes 62a and 66a, respectively. The elements 13c and combined 35c and 33c are separate from each other. The holes 62 and 66 need not be precisely located as it is the mold cavity which defines the exact positions of elements 13c and 35c. It will be noted from FIG. 6 that the molded elements such as 13c and 35c, have regular sides and open centers to avoid large walls of nonuniform thickness, which are difficult to mold without distortion.

Gearbox 1 is mounted to a frame (not shown) through bolts or screws inserted in mounting holes 58a through 58c. The typical use is as the power source for paper movement in a small to medium-sized printer.

Plate 5 is populated with the gears and other elements, such as gears 7 and 9 and swing arm 60. These elements mount on elements on plate 5. Gear 7, for example, is mounted on stud 35e for rotation, and arm 60 is mounted to pivot on stud 35a. Spring 56 is placed around post 54. Plate 3 is then placed parallel to the populated plate 5 with the corresponding elements matching, i.e. stud 21e faces stud 35e and is positioned to be a shaft for gear 1. In general, studs 21a through 21j are similarly positioned with respects to studs 35c through 35a respectively. Plates 3 and 5 are then held together tightly by washers 70a through 70d which receive thread-cutting screws 72a through 72d respectively. Screws 72a through 72d tap holes 13a' through 13d' (FIG. 4) in standoffs 13a through 13d respectively to hold washers 70a through 70d firmly to plate 3.

Figure 7A:
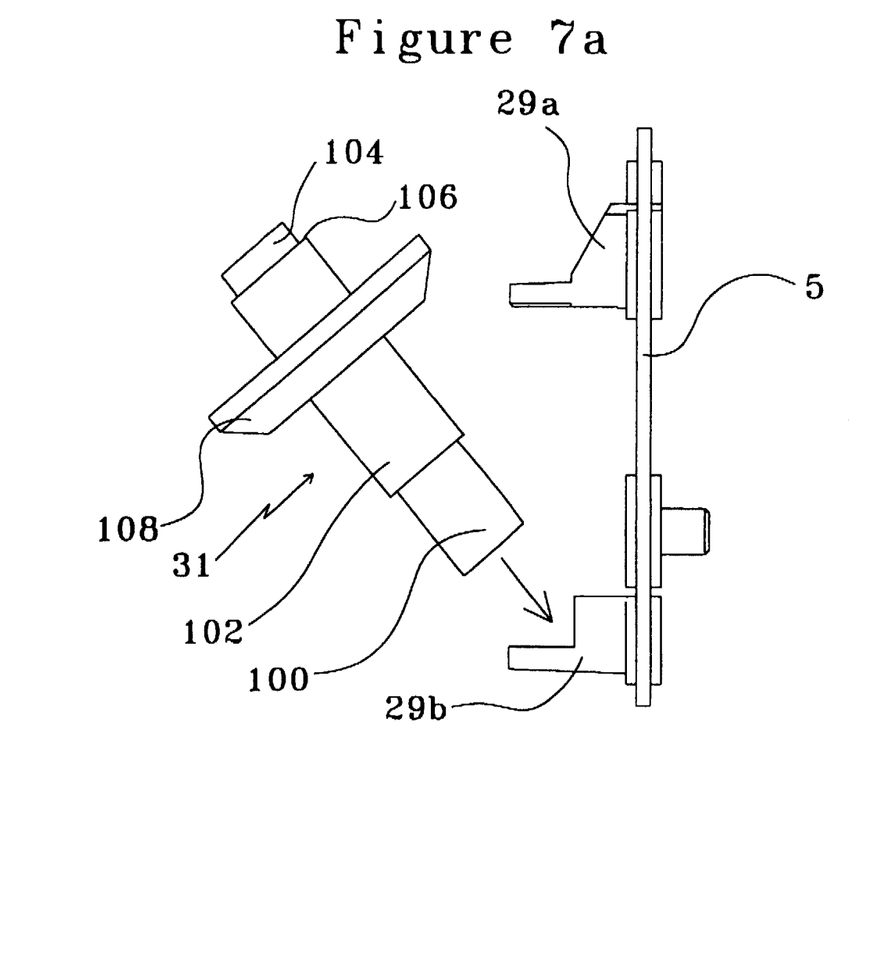
FIGS. 7a, 7b, and 7c show the mounting of a bevel gear.
Figure 7B:
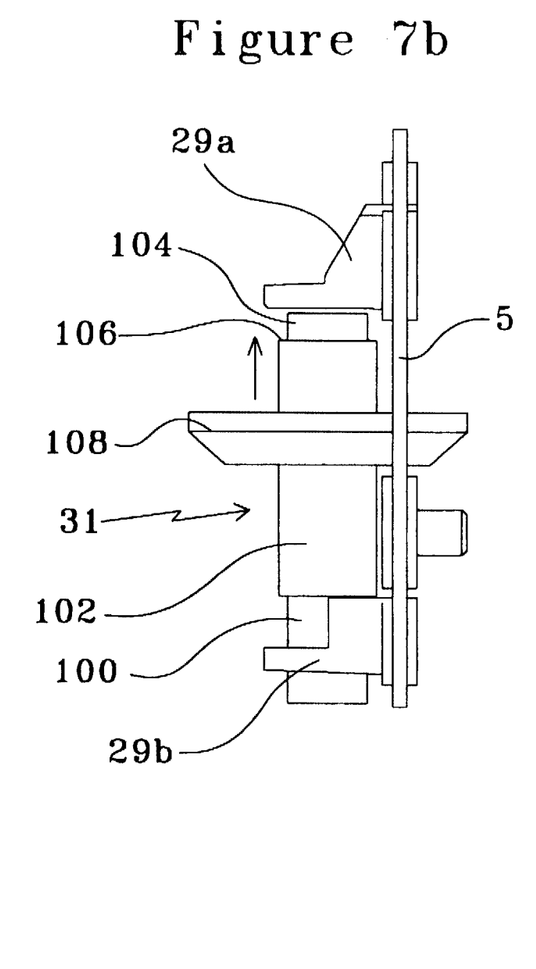
Figure 7C:
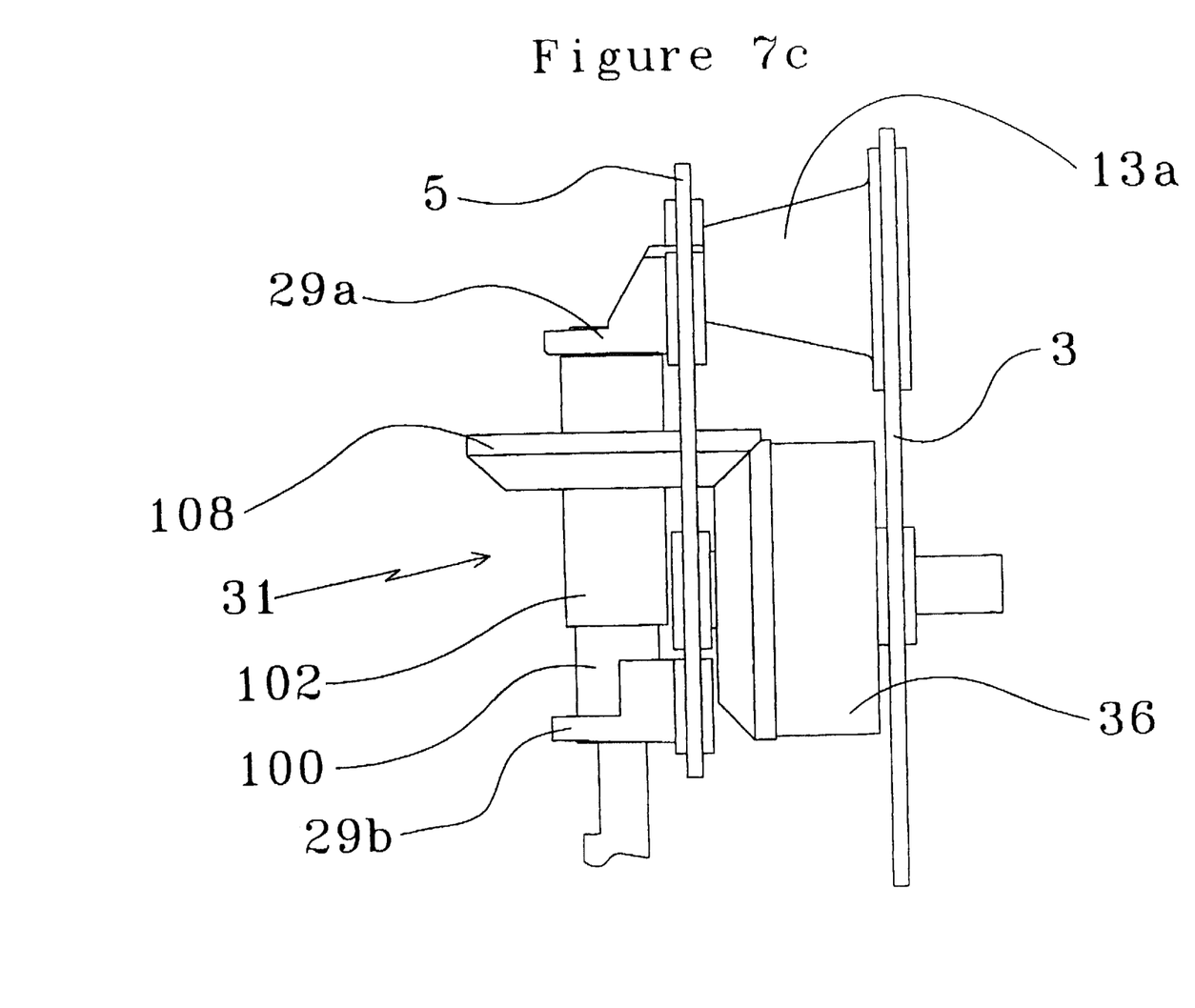

Mounting of bevel gear 31 is shown in more detail in FIGS. 7a, 7b and 7c. Bevel gear 31 has a lower cylindrical shaft 100 which is smaller than the central cylindrical section 102. Gear 31 has an upper cylindrical element 104 which is smaller than central cylindrical section 102, thereby forming an upper ledge 106. Central section 102 has a toothed cylindrical section 108. As shown in FIG. 7a gear 31 is brought to the bottom support 29b with the lower shaft inserted in a hole defined by support 29b.

Bevel gear 31 is then rocked upward to the vertical position (FIG. 7b) with upper element 104 under top support 29a. Gear 31 is then moved upward to bring element 104 into a hole defined by support 29a, and as shown in FIG. 7c, plate 5 with gear 31 so positioned and is mounted in its final position opposite populated plate 3. Toothed gear 36, mounted on plate 3 meshes with the toothed section 108. This physically traps gear 31 in place. The teeth of gear 31 mesh with the teeth of gear 36 at a 45° degree angle, thus forcing gear 31 upward during operation. This upward force forms a firm positioning of ledge 106 against the bottom of top support 29a. The holes of supports 29a and 29b are small enough to prevent gear 31 from moving out of engagement with gear 36.

Electrical Grounding: Because of the motion of the gears in relation to each other and in relation to the features that support them an electrical charge accumulates in the metal plates 3 and 5. If this charge is allowed to accumulate long enough, it will ultimately discharge suddenly as a spark. This event creates enough electromagnetic interference to disrupt the electronics controlling the printer enough to require a hard reset of the electronics. To drain off the electrical charge one the gearbox plates 3 or 5 is connected to machine electrical ground by means of a cable (not shown) that is screwed to one of the plates. The other plate is then electrically connected to the first by means of a simple metal coil compression spring 56 that is located over post 54 molded to plate 5 for this purpose.

Figure 6B:
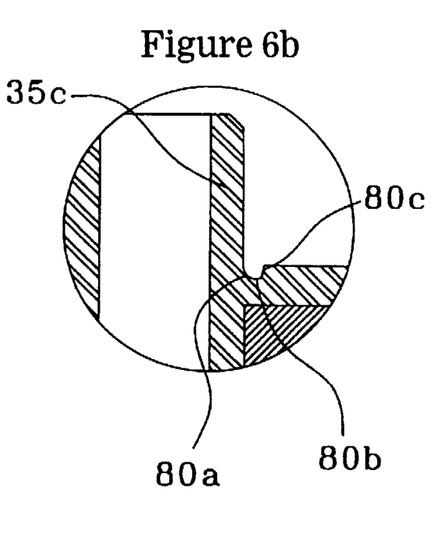

Undercuts: Some of the molded stub shafts are under considerable radial loads due to gear forces during operation. Also, the bosses at the end of the conical spacers 13a–13d molded to the plate 5 are under considerable tension to the screws 13a'–13d' that hold the plate 3 to these standoffs. A finite element analysis of a typical stub shaft shows that stresses in the sharp corner between the stub shaft and the plastic "flange" surrounding it would over stress the material and risk breakage and/or dimensional creep over time. As is conventional in this kind of situation, radiused undercuts (illustratively, 80 in FIG. 6a,) are employed instead of sharp corners at all intersections between the cylindrical bosses and their flanges. The flanges on the plates 3 and 5 at locations of helical gears act as thrust bearings since significant axial forces act on these gears. The undercuts 80 diminish the surface area over which the gear and face and the flange touch each other. To minimize this effect, as best illustrated in FIG. 6b, the undercuts are given a special cross section. Instead of each consisting of a single radius, they consist of a series one 90° radius 80a at 0.5mm starting at the central element, followed by a tangential 0.2 radius 80b for 80°, followed by a tangential straight line 80c. Even though the requirements to be addressed by the undercuts differ from location to location, all the undercuts are given the same shape for ease of specifying them.

Materials: Because of the same stresses that led to the use of undercuts, a plastic material without structural reinforcement would experience excessive deflection and creep under the expected load. Reinforcement is obtained by adding 30% glass fiber to the plastic that is molded to the plates. The current material is nylon 6/6 with the above mentioned glass fiber plus 13% polytetrafluoroethylene and 2% silicone oil, the latter two to improve wear and friction. The currently specified material for the gears is Defrin 500P(trademark) a low cost acetal resin without additives. It is still possible to add anti wear additives into the plastic of at least one of the gears to get adequate wear life which may be necessary in many applications.

Figure 8:
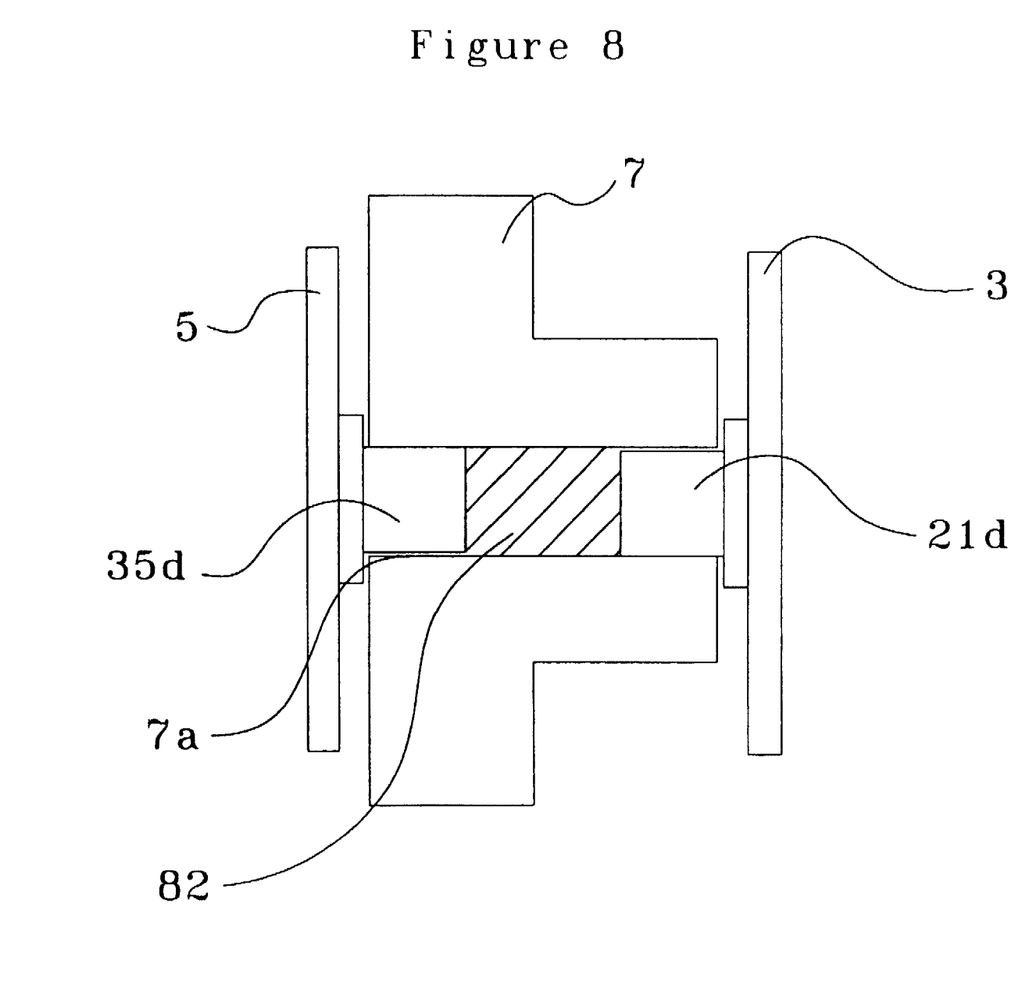
FIG. 8 illustrates a staggering of studs and lubrication at the studs.

Stagger: It is generally assumed that the two stub shafts that extend from the two plates to support a particular gear should ideally be perfectly concentric with each other. However, this invention may intentionally include noncoaxial location of the shafts. Reference is made to FIG. 8 in which the gear may be illustratively, gear 7. Consider that there is clearance between the bore, such as bore 7a, of the gear 7 and the shafts on which gear 7 runs, and that because of the forces on the gears the bores contact the shafts on only one spot, i.e., not around the full circumference. Thus the center lines of such gears cannot possibly be concentric with their supporting shafts. If the center lines of the shafts were designed to be located at the ideal positions of the gears, then the gears themselves would be improperly located. The misalignment therefore modifies the positions of the shafts 21d and 35d in such a way that the gear 7 ends up at its proper location after moving into operating position against shafts 21d and 35d. This correction is very small, typically by 0.05 mm, because this is the nominal radial clearance between bores and shafts. Gear location will, of course, also be affected by a number of tolerances affecting the locations of the shafts and the diameters of shafts and holes. These tolerances are comparable to or greater than the mentioned correction. With the molding technique of this invention the correction does not add any manufacturing cost. Since the correction is so small, it may only have a measurable benefit at one or two of the gears in that transmission error, acoustical noise and wear (see below) might be improved.

The staggering should also achieve another effect. The systems of forces acting on most of the gears are such that they would not press the gears against the same side of the shaft along their full length. For example, in the most extreme case, one end of the hole through the gear might push against the top of the shaft, and the other end might push against the bottom. Clearly, if opposing shafts for a particular gear were to be perfectly aligned, this implies that the gear would be tilted and that it would be supported primarily by the edges of its bore and not over the full length of the stub shafts. If one now staggers the shafts as indicated above, the gear is straightened up, and the bore 7a touches the stub shafts 21e and 35e over their full lengths. This wider contact pattern should lead to reduced wear of bore 7a and shafts 21e and 35e. Wear resulting from the tilting of gears without the staggering is observed in which the bores in some of the gears wear significantly at the ends, and much less in the middle.

Lubrication: Noticeable wear of shafts and gears can occur in actual operation. Often it is necessary to supply wet lubrication at the locations where a plastic gear surface slides against a plastic stud surface. The stud shafts that are molded onto the plates 3 and 5 of gearbox 1 provide a good opportunity for effective lubrication. A cavity 82 (FIG. 7) is formed inside the bore of each gear (77 in FIG. 7) by the bore (7a in FIG. 7) of the gear and the end surfaces of the stud shafts (21e and 35e in FIG. 7). This cavity 82 is filled with grease during assembly. The grease, consisting of oil that is suspended in a gelling agent, is intended to be a reservoir that allows oil to seep out, into the areas of relative motion. The cavity 82 formed inside the bore of the gear is a convenient place to store the grease, out of danger from being contaminated or wiped off. Were the architecture similar to previous products in which the full length of the holes through the gears was occupied by a stationary shaft, not enough room would have been available to allow the use of grease as a kind of wick. Instead one would have had to resort to oil lubrication, limited in quantity by the small clearance, typically between 0.01 mm and 0.1 mm, between the shaft and the gear. Oil application might also have turned out to be messier.

Greasing Procedure:

Plate 5 of gearbox 1 is laid down onto a holding fixture.

All the gears with through bore holes are placed on their respective supporting molded features.

A measured quantity of grease is injected into each gear hole. The tip of the injection tool is shaped so that as the grease fills the cavities it oozes up in the space between the tip and the bore thorough the gear assuring that the wall of the hole through the gear gets wetted. A seal may be established between a surface on the nozzle and the upper edge of the gear so that pressure is generated in the cavity that pushes some of the lubricant into the small clearance between the hole in the gear and the molded support feature on the plate 5.

Gears not having a through bore are handled in a special way, (gears 19 and 39 in the embodiment). For these grease is inserted into the holes in these gears "off-line". Also, grease is smeared on the bearing studs on these gears and into recessed areas in the gears around these studs. The grease on the studs is for initial run-in lubrication. The grease in the recess is to act as an oil reservoir from which oil will seep into the bearing area over time.

These specially-handled gears are installed onto their locating features on the inner plate.

Plate 3 is laid over the assembly and screwed down by screws 72a through 72d. The elements for gears on this plate now trap the grease that had been inserted earlier into the gears.

The placement of the arm 60 with gear 9 was ignored in the above procedure because it does not substantially affect this lubrication procedure.

Figure 9:
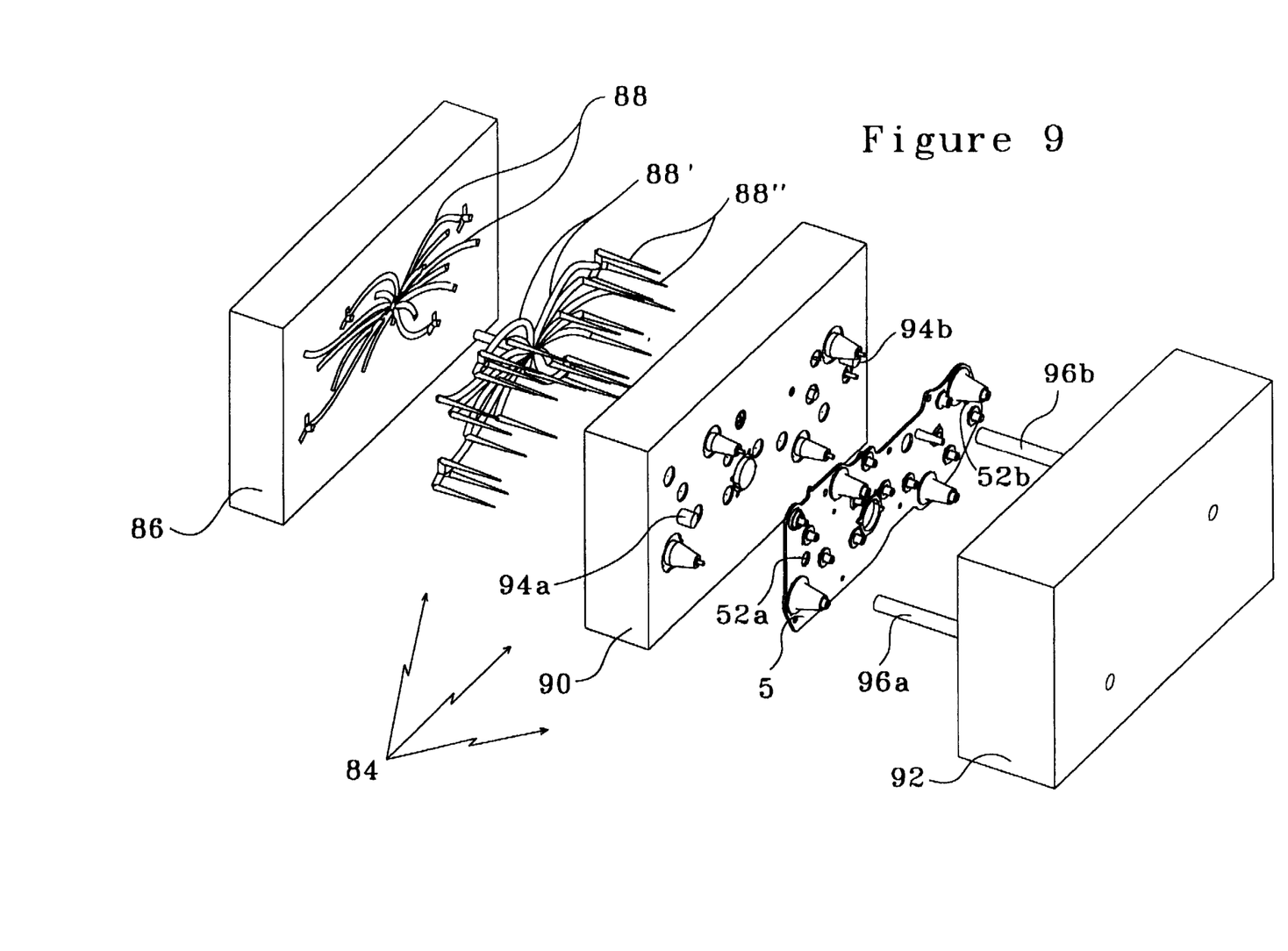
FIG. 9 illustrates the molding operation on one of the plates prior to closing of the molding elements.

Molding: FIG. 9 shows the plate 5 as it emerges from a separated mold 84 comprising stationary mold base 86 having runners 88. A central movable element 90 of the mold and a second movable outside element 92 of the mold are separated at this stage. The full runner system is shown illustratively as system 88' and 88" as it is comprised of runners 88' formed partly by element 86 and runners 88" formed entirely by element 90 as shown in FIG. 9.

As is conventional, cavities and inserts in the mold elements 90 and 92 define the shapes molded. Plate 5 is mounted on studs 94a and 94b of central element 90 on holes 52a and 52b respectively. The three mold elements 86, 90, and 92 are then forced together under very high pressure. The mold cavities and inserts on each side of plate 5 define empty shapes as described for the finished plate 5. The melted plastic mixture is then injected through runners 88, 88' and 88" through element 86. To minimize distortion from unsymmetrical flow of plastic, larger elements, such as standoffs 13a–13d, have three, equally spaced entrance holes into the mold (termed gates) from runners 88". Subsequently, after cooling of the plastic to solid, the mold elements 86, 90 and 92 are separated and the plate 5 with molded elements attached is pushed free by movement of ejector pins 96a and 96b (two shown, typically many more than two are used).

Figure 10:
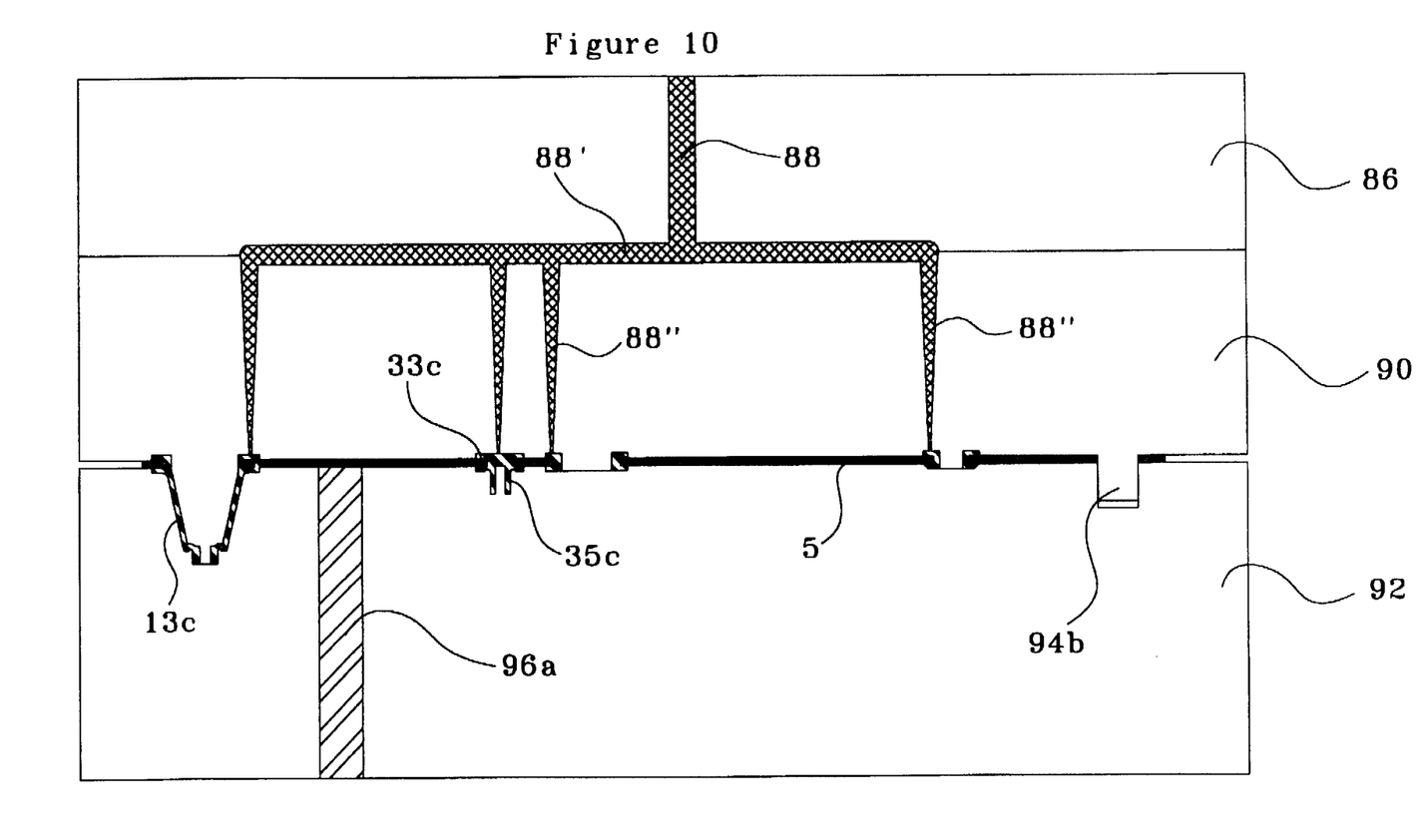
FIG. 10 illustrates the actual molding operation on one of the plates.

FIG. 10 illustrates by cross section the location of molding elements at the time of molding. Plastic in the system of runners 88, 88' and 88" is shown by regular cross hatching. The steel plate 5 is shown by light single cross hatching. Molded parts are shown by heavier single cross hatching, and the ejector pin is shown by double cross hatching.

For purposes of illustration, the same elements as FIG. 6 are assumed to be molded in FIG. 9. These are standoff 13b and stud 35e with back side 33e in plate 5. Plate 5 is positioned by locator stud 94b inserted in locator hole 52c. Ejector pin 96a will push plate 5 free when the molded element 13b and element 33e and 35e are sufficiently cool. The foregoing is conventional except that the molding is of separate elements such as 13b and combined 33e and 35e, each supported on the plate. This may be termed "outset" molding in contrast to the conventional molding of elements molded only of plastic or molded around other features.

It will be apparent that the economic, high precision product of this invention can take many forms as well as the gearbox of the embodiment disclosed. Patent coverage of corresponding breadth is sought, as provided by law, with particular reference to the accompanying claims.

What is claimed is:

1. Mechanical apparatus comprising a first plate having separate parts each anchored to a plurality of locations on said first plate by enclosing said first plate through at least three holes in said first plate, a second plate having separate parts each anchored to a plurality of locations on said second plate by enclosing said second plate through at least three holes in said second plate, said first plate and said second plate being mounted in a fixed, spaced relationship, and mechanical elements mounted on said molded parts in intermeshed relationship for movement.

2. The apparatus as in claim 1 in which said mechanical elements comprise intermeshed gears.

3. The apparatus as in claim 2 in which said separate parts comprise facing studs on which one of said gears are mounted for rotation.

4. The apparatus as in claim 3 in which a plurality of said facing studs with individual mounted gears are noncoaxial to compensate for forces of the gear mounted on said studs.

5. The apparatus as in claim 3 in which said studs are spaced apart to define a cavity between said studs and said cavity contain a grease as a lubricant.

6. Mechanical apparatus comprising a first plate having separate parts molded to a plurality of locations on said first plate, a said second plate having separate parts molded to a plurality of locations on said second plate, said first plate and said second plate being mounted in a fixed, spaced relationship, and gears mounted on said molded parts in intermeshed relationship for movement, said separate parts comprising facing studs on which one of said gears are mounted for rotation, said studs being slightly non-coaxial to compensate for forces of the gear mounted on said studs.

7. The apparatus as in claim 6 in which a plurality of said facing studs with individual mounted gears are noncoaxial to compensate for forces of the gear mounted on said studs.

8. The apparatus as claim 7 in which said studs are spaced apart to define a cavity between said studs and said cavity contains a grease as a lubricant.

9. The apparatus as in claim 4 in which said studs are spaced apart to define a cavity between said studs and said cavity contains a grease as a lubricant.

10. The apparatus as in claim 5 in which said studs are spaced apart to define a cavity between said studs and said cavity contains a grease as a lubricant.

11. A gearbox comprising a first plate having separate parts molded on said first plate at a plurality of locations on said first plate, a second plate having separate parts molded on said second plate at a plurality of locations on said second plate, said first plate and said second plate being mounted in a fixed, spaced relationship, said parts inside of said plates defining at least two shafts, gears mounted in intermeshed relationship on said shafts, molded parts on at least the outside of one of said plates suitable to mount a gear on the outside of said one plate, and an opening on said one plate located to permit a part of a gear mounted on said part suitable to mount a gear to extend through said plate on which it is mounted and intermesh with a gear on the side of said plate on which said intermeshed gears are located.

12. The gearbox as in claim 11 said in which gear mounted on the outside of said plates is located entirely by having extensions inserted through holes of said molded parts and by contact with said gear to which it is intermeshed.

13. The apparatus as in claim 1 in which said at least three holes in said first plate and said at least three holes in said second plate each comprise a central hole and three holes generally equally spaced around said central hole.

14. The apparatus as in claim 2 in which said at least three holes in said first plate and said at least three holes in said second plate each comprise a central hole and three holes generally equally spaced around said central hole.

15. The apparatus as in claim 3 in which said at least three holes in said first plate and said at least three holes in said second plate each comprise a central hole and three holes generally equally spaced around said central hole.

* * * * *

UNITED STATES PATENT AND TRADEMARK OFFICE
CERTIFICATE OF CORRECTION

PATENT NO. : 5,799,548

DATED : September 01, 1998

INVENTOR(S) : Henry M. Brooks, Daniel G. Mlejnek, Harald Portig and Richard A. Seman, Jr.

It is certified that error appears in the above-identified patent and that said Letters Patent is hereby corrected as shown below:

| | |
|---|---|
| Col. 3, l. 17 | Change "respectfully" to read -- respectively --. |
| l. 39 | Change 35c through 35a to read -- 35a through 35j --. |
| l. 62 | Delete "degree". |
| Col. 4, l. 19 | After "screws" add --72a through 72d in holes --. |
| l. 34 | After "series" insert -- of --. |
| l. 48 | Change "Defrin" to read -- Delrin --. |
| Col. 5, l. 36 | Change 'FIG. 7' to read -- FIG. 8 --. |
| l. 37 | Change "77" to read -- 7 --. |
| l. 37 | Change "FIG. 7" to read -- FIG. 8 --. |
| l. 38 | Change "FIG. 7" to read -- FIG. 8 --. |
| l. 39 | Change "FIG. 7" to read -- FIG. 8 --. |
| l. 61 | Change "thorough" to read -- through --. |
| Col 6, l. 2 | Change "19" to read --18 --. |
| l. 49 | Delete "the same". |
| l. 49 | After "as" insert -- in --. |
| l. 57 | Change "outset" to read -- outsert --. |

Cancel claims 1, 2, 3, 13, 14 and 15.

Col. 7, l. 22   Delete "said".

Figure 8   Change 21d to 21e and change 35d to 35e.

Signed and Sealed this

Twenty-fourth Day of August, 1999

Attest:

Q. TODD DICKINSON

*Attesting Officer*   *Acting Commissioner of Patents and Trademarks*